United States Patent [19]  [11] Patent Number: 4,854,968
Otsuka et al.  [45] Date of Patent: Aug. 8, 1989

[54] METHOD OF PREPARING HIGH-PURITY METAL AND ROTARY COOLING MEMBER FOR USE IN APPARATUS THEREFOR

[75] Inventors: Ryotatsu Otsuka; Shigemi Tanimoto; Kazuo Toyoda, all of Sakai, Japan

[73] Assignee: Showa Aluminum Corporation, Osaka, Japan

[21] Appl. No.: 137,213

[22] Filed: Dec. 22, 1987

[30] Foreign Application Priority Data

Dec. 25, 1986 [JP] Japan .................................. 61-313247
Dec. 25, 1986 [JP] Japan .................................. 61-313248
Dec. 25, 1986 [JP] Japan .................................. 61-313249

[51] Int. Cl.$^4$ ............................................... C22B 7/00
[52] U.S. Cl. ........................................ 75/63; 75/67 R; 75/68 R; 75/93 R; 266/235; 266/241
[58] Field of Search ................. 75/63, 93 R; 266/241, 266/235

[56] References Cited

U.S. PATENT DOCUMENTS

3,543,531 12/1970 Adams ..................................... 75/63

Primary Examiner—Peter D. Rosenberg
Attorney, Agent, or Firm—Armstrong, Nikaido, Marmelstein & Kubovcik

[57] ABSTRACT

A metal having a high purity is prepared by immersing a hollow rotary cooling member in a molten metal containing eutectic impurities and rotating the cooling member while supplying a cooling fluid to the interior of the cooling member, whereby the high-purity metal is caused to crystallize out on a metal deposition area of the peripheral surface portion of the cooling member present under the surface of the molten metal, the metal deposition area being the peripheral surface of at least a part of the entire portion, present under the melt surface, of the member. When the purified metal is caused to crystallize out by rotating the cooling member, a flow of molten metal having a downward velocity component is produced in the vicinity of an upper part of the entire portion, present under the melt surface, of the cooling member.

15 Claims, 9 Drawing Sheets

METHOD OF PREPARING HIGH-PURITY METAL AND ROTARY COOLING MEMBER FOR USE IN APPARATUS THEREFOR

BACKGROUND OF THE INVENTION

The present invention relates to a method of preparing a high-purity metal and a rotary cooling member for use in an apparatus therefor. More particularly, the invention relates to a method of purifying a metal, such as aluminum, silicon, magnesium, lead or zinc, containing eutectic impurities utilizing segregation solidification to prepare a high-purity metal having a lower content of eutectic impurities than the original metal, and to a rotary cooling member for use in an apparatus for the method.

The term "eutectic impurities" as used herein and in the appended claims refers to impurities which are eutectic with the metal to be purified.

For example, a method is known of purifying to a higher purity aluminum containing impurities forming eutectices with aluminum, by utilizing the principle of segregation solidification. This method comprises melting the aluminum to be purified, placing the molten aluminum into a crucible, maintaining the melt at a temperature higher than the solidification temperature thereof at all times, immersing into the melt a hollow rotary cooling member in the form of a downwardly tapered cylinder, and rotating the cooling member while introducing a cooling fluid into the cooling member to maintain the surface of the member at a temperature not higher than the solidification temperature so that the impurities released in the vicinity of the solid-liquid interface when aluminum crystallizes out on the outer peripheral surface of the cooling member are dispersed through and mixed with the entire liquid phase to reduce the thickness of the layer of concentrated impurities in the vicinity of the solid-liquid interface, consequently causing aluminum to crystallize out on the peripheral surface with a higher purity while giving an increased temperature gradient to the layer of concentrated impurities in the liquid phase (Examined Japanese Patent Application SHO No. 61-3385). The principle of this method is described also in U.S. Pat. No. 4,469,512. In order to decrease the thickness of the concentrated impurity layer in the liquid phase in the vicinity of the solid-liquid interface and thereby afford an increased temperature gradient for an improved purifying efficiency, the speed of the cooling member relative to the molten aluminum must be increased as one of the requirements therefor. However, there is a limitation to the increase in the relative speed since the rotation of the cooling member causes the molten aluminum to flow in the same direction as the direction of rotation of the cooling member to produce a whirl, posing a limitation on the improvement in the purification efficiency. Moreover, an increase in the speed of rotation of the cooling member produces a greater centrifugal force, which presents difficulty in the deposition of crystals of high-purity aluminum on the peripheral surface of the cooling member to result in lower productivity. The increased speed makes the melt surface wavy and permits air to be incorporated into the molten aluminum and to react with the aluminum, forming a large quantity of $Al_2O_3$ as scum and entailing a need for skimming. The scum scatters about, adhering to the inner surface of the crucible and causing trouble to the operation. The large quantity of scum is likely to impair the purification efficiency. The molten aluminum surface is liable to wave markedly when the formation of an aluminum block starts on the peripheral surface of the cooling member.

To decrease the speed of the whirling flow of molten aluminum, therefore, it has been proposed to attach speed reducing baffles to the inner periphery of the crucible as arranged circumferentially thereof at a predetermined spacing (see Examined Japanese Utility Model Application SHO 61-38912). This arrangement makes it possible to give an increased speed to the cooling member relative to the molten aluminum without very greatly increasing the rotational speed of the cooling member, whereby an improved purification efficiency can be achieved. Nevertheless, the presence of the baffles locally varies the flow velocity of the molten aluminum and consequently produces a flow of molten aluminum having an upward velocity component in the vicinity of an upper part of the portion of the cooling body which is present below the melt surface. As a result, the surface of the molten aluminum becomes more markedly waved to further enhance the adverse effect due to the waving.

These problems are encountered similarly also with the above-mentioned metals other than aluminum.

SUMMARY OF THE INVENTION

The main object of the present invention is to provide a method of preparing a high-purity metal free of the foregoing problems and a rotary cooling member for use in an apparatus for practicing the method.

The invention provides a method of preparing a high-purity metal by immersing a hollow rotary cooling member in a molten metal containing eutectic impurities and rotating the cooling member while supplying a cooling fluid to the interior of the cooling member, whereby the high-purity metal is caused to crystallize out on a metal deposition area of the peripheral surface portion of the cooling member present under the surface of the molten metal, the metal deposition area being the peripheral surface of at least a part of the entire portion, present under the melt surface, of the cooling member. When the high-purity metal is caused to crystallize out by rotating the cooling member in this method, a flow of molten metal having a downward velocity component is produced in the vicinity of an upper part of the entire portion, present under the melt surface, of the cooling member.

In this method, the flow of molten metal having a downward velocity component is produced in the vicinity of an upper part of the entire cooling member portion which is present under the melt surface, for example, by the following three methods.

With the first of these methods, the entire peripheral surface of the portion, present under the melt surface, of the cooling member serves as the metal deposition area, and the temperature of at least the upper portion of the metal deposition area is so adjusted as to be highest at its upper end and to decrease downward, whereby the velocity of crystallization of the high-purity metal on the upper portion of the deposition area is made lowest at the upper end and made to increase downward, thereby permitting the high-purity metal to crystallize out on the deposition area to form a metal block having a downwardly flaring outer peripheral surface at least at its upper portion and consequently producing the flow of molten metal when the cooling member is rotated.

With the second method, the cooling member portion present under the melt surface has a hollow cylindrical or downwardly flaring upper part whose peripheral surface serves as a non-deposition area, and the peripheral surface of the other part of the member downward from the upper part serves as the metal deposition area. The temperature of at least the upper portion of the metal deposition area is so adjusted as to be highest at its upper end and to decrease downward, whereby the velocity of crystallization of the high-purity metal on the upper portion of the deposition area is made lowest at the upper end and made to increase downward, thereby permitting the high-purity metal to crystallize out on the deposition area to form a metal block having a downwardly flaring outer peripheral surface at least at its upper portion and consequently producing the flow of molten metal when the cooling member is rotated.

With the third method, the cooling member portion present under the melt surface has a downwardly flaring upper part which, when rotated, produces the above-mentioned flow of molten metal.

Molten aluminum can be treated by the method of the invention without scattering about, with the surface of the molten metal prevented from waving. This diminishes the amount of scum in the form of a metallic oxide formed by the reaction of the molten metal with the oxygen in air, consequently obviating the problems that would result from occurrence of a large quantity of scum.

The present method is practiced by an apparatus comprising a hollow rotary cooling member. The entire peripheral surface of the portion of the cooling member to be present under the surface of molten metal serves as a high-purity metal deposition area, and this area has a downwardly flaring upper portion. Alternatively, the cooling member portion to be preset under the melt surface has a non-deposition area at an upper part of its peripheral surface and a high-purity metal deposition area at the lower part thereof, the non-deposition area having a downwardly flaring upper portion.

The present invention will be described in greater detail with reference to the accompanying drawings.

DESCRIPTION OF THE PREFERRED EMBODIMENTS

Throughout the drawings, like parts and like material are designated by like reference numerals.

Figure 1:
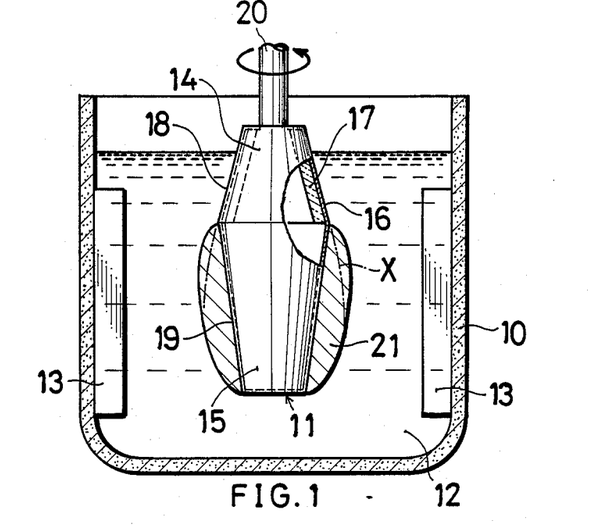
FIG. 1 is a view partly broken away and in vertical section showing an apparatus for practicing the method of the invention, i.e. a first embodiment.

With reference to FIG. 1 showing a first embodiment of apparatus for practicing the method of the invention for preparing a high-purity metal, the apparatus comprises a crucible 10 for containing a molten metal 12 and a hollow rotary cooling member 11 for use in the crucible 10. The crucible 10 is made of a material which will not react with the molten metal 12 to be placed into the crucible 10 or contaminate the metal 12. For example, when the molten metal 12 is molten aluminum, a graphite crucible is used. A plurality of baffles 13 for reducing the flow velocity of the molten metal are removably fixed to the inner periphery of the crucible 10 as arranged at a predetermined spacing circumferentially thereof. For the same reason as given above, the baffles 13 are also made of a material similar to that of the crucible 10. A substantially constant predetermined amount of molten metal 12 is placed into the crucible 10 so as to position the upper ends of the baffles 13 slightly below the surface of the molten metal.

The hollow rotary cooling member 11 has a diameter gradually increasing from its upper end to a longitudinally intermediate portion thereof and gradually decreasing from the intermediate portion to its lower end. Thus, the member 11 has a downwardly flaring cylindrical upper portion 14 and a downwardly tapered cylindrical lower portion 15. The downwardly flaring portion 14 has a peripheral wall 16 lined with a heat-insulating material 17, so that the outer peripheral surface of the flaring portion 14 serves as a non-deposition area 18 at the part thereof to be positioned under the melt surface. Alternatively, the outer surface of the peripheral wall 16 of the flaring portion 14 may be covered with a heat insulating material which will not react with the molten metal 12 or contaminate the melt 12 for the outer surface of the part thereof to be positioned under the melt surface to serve as the non-deposition area. The peripheral wall 16 of the flaring portion 14 may be made of a heat insulating material which has heat resistance and will not react with or contaminate the melt 12. The outer peripheral surface of the downwardly tapered portion 15 serves as a high-purity metal deposition portion 19. When this outer surface of the portion 15 serves as such, a block of high-purity metal crystallizing out on this area 19 can be readily removed from the area 19 as by scraping off downward for the collection of the block.

The hollow cooling member 11 is attached to the lower end of a hollow rotary shaft 20, which is internally provided with a cooling fluid supply pipe (not shown) for supplying therethrough a cooling fluid from a supply source to the interior of the cooling member 11. The rotary shaft 20 and the cooling member 11 are rotatable about a vertical axis by unillustrated drive means disposed above the crucible 10. When preparing a high-purity metal, the cooling member 11 is immersed in the specified quantity of molten metal 12 so that the surface of the molten metal 12 will be positioned slightly above the midportion of the height of the downwardly flaring cylindrical portion 14. The lower end of the cooling member 11 is positioned slightly above the lower ends of the baffles 13. The cooling member 11 is made also of a material, such as graphite or ceramics, which will not react with the molten metal 12 or contaminate the metal 12.

The molten metal 12 to be purified, prepared in a melting furnace (not shown) and containing eutectic impurities is placed into the crucible 10 of the apparatus having the foregoing construction. At this time, the rotary cooling member 11 is in a raised position outside the crucible 10. After the molten metal 12 has been placed into the crucible 10 in a specified amount, the cooling member 11 is immersed in the metal 12 to such a position that the liquid level is located at an intermediate portion of the height of the downwardly flaring portion 14, with the lower end of the member 11 positioned slightly above the lower ends of the baffles 13. The upper open end of the crucible 10 is then closed with a closure (not shown). The molten metal 12 is held at an elevated temperature beyond the solidification temperature thereof by heating. The cooling member 11 is then rotated while supplying a cooling fluid, such as air, nitrogen or argon, to the interior of the member 11. The rotation of the member 11 causes the downwardly flaring tapered cylindrical portion 14 to produce in the molten metal 12 a flow having a downward velocity component in the vicinity of the portion 14. With continued rotation, primary metal crystals having a high purity are deposited on the metal deposition area 19 of the member 11, forming a smooth solid surface. Eutectic impurities are released into the liquid phase to form a layer of concentrated eutectic impurities in the liquid phase in the vicinity of the solid-liquid interface. The rotation of the cooling member 11 causes the molten metal 12 to flow also in the same direction as the rotation of the member 11, but the baffles 13 decrease the flow velocity of the molten metal 12, consequently giving a considerably great speed to the cooling member 11 relative to the liquid phase, hence a considerably great difference between the peripheral speed of the cooling member 11 and the flow velocity of the molten metal 12. This effectively agitates the concentrated impurity layer formed in the vicinity of the interface and mixes this layer with the other major portion of the liquid phase, whereby the impurities in the layer are diffused through the entire liquid phase to reduce the thickness of the concentrated impurity layer and give an increased temperature gradient to this portion. Moreover, the baffles 13 produce turbulence in the molten metal 12, consequently reducing the thickness of the concentrated impurity layer. When the metal is allowed to solidify progressively in this state, a metal having an exceedingly higher purity than the original metal crystallizes out on the peripheral surface of the cooling member 11 in the form of a high-purity metal block 21.

Even after the formation of the metal block 21 is started, the downwardly flaring upper portion 14 of the cooling member 11 produces the flow having a downward velocity component in the molten metal 12 in the vicinity of the upper portion, thereby precluding the melt surface from waving markedly and reducing the amount of scum which comprises a metallic oxide formed by the reaction of the molten metal 12 with the oxygen air.

When a predetermined amount of high-purity metal block 21 has been deposited on the deposition area 19 of the cooling member 11, the member 11 is brought to a halt to complete the operation. The metal block 21 formed is removed from the cooling member 11 by raising the member 11 above the crucible 10 and mechanically scraping the block off downward or remelting the block.

The apparatus of FIG. 1 may be used in the following manner for preparing a high-purity metal. When the rotary cooling member 11 is rotated while supplying a cooling fluid to its interior in the foregoing method, the temperature cf the upper portion of the metal deposition area 19 is so adjusted as to be highest at its upper end and to decrease downward, whereby the velocity of crystallization of the high-purity metal on the upper portion of the deposition area 19 is made lowest at the upper end and made to increase downward. This permits the high-purity metal to crystallize out on the area 19 to form a metal block 21 having a downwardly flaring outer peripheral surface at least at its upper portion. When the metal block 21 has a downwardly flaring outer periphery at least at its upper portion as indicated in dot-and-dash lines X in FIG. 1, a flow is produced in the molten metal 12 which has a downward velocity component in the vicinity of the deposition area 19 after the block 21 is formed. This further improves the waving inhibiting effect by the downward velocity component, produced in the melt 12 by the downwardly flaring tapered portion 14 and described as to the first method. The temperature of at least the upper portion of the metal deposition area 19 is so adjustable as to be highest at its upper end and to decrease downward, for example, by closing the upper open end of the crucible 10 with an openable closure (not shown) and heating the inside atmosphere of the crucible 10 above the surface of the molten metal 12 by a heater, burner or the like, by heating the cooling member 11 at the portion thereof above the surface of the molten metal 12 with a heater, burner or the like, by supplying the cooling fluid to the interior of the cooling member 11 at a rate which is low at its upper end and decreases downward, or by a combination of such methods. When heating is resorted to, the temperature even of the upper end of the deposition area 19 should be lower than the solidification temperature of the metal so as not to inhibit the crystallization of purified metal on the deposition area 19.

Figure 2:
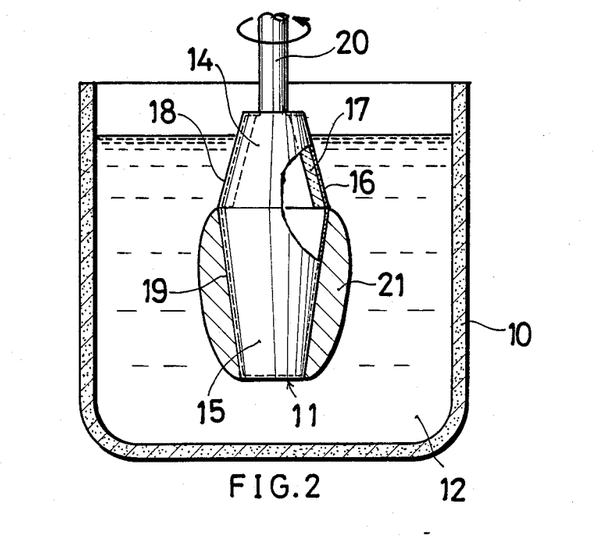
FIG. 2 is a view partly broken away and in vertical section showing another apparatus for practicing the method of the invention, i.e. a second embodiment.

With reference to FIG. 2 showing another apparatus as a second embodiment, this embodiment differs from the first only in that the crucible 10 is provided with no baffle 13 on its inner periphery. As is the case with the first embodiment, a high-purity metal is caused to crystallize out in the form of a block 21 on the deposition area 19 by one of the two methods described. In this embodiment, a flow having a downward velocity component is also produced in the molten metal 12 in the vicinity of the upper part of the portion, present under the melt surface, of the cooling member 11.

Figure 3:
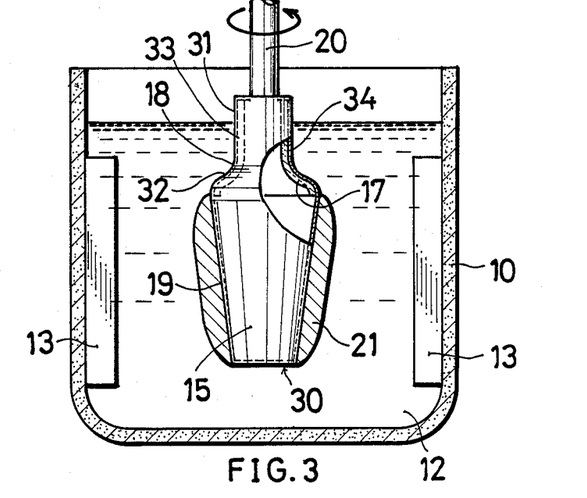
FIG. 3 is a view partly broken away and in vertical section showing another apparatus for practicing the method of the invention, i.e. a third embodiment.

With reference to FIG. 3 showing another apparatus as a third embodiment, a hollow rotary cooling member 30 comprises a cylindrical portion 31 extending downward from its upper end over a predetermined length and having a uniform diameter, a downwardly flaring portion 33 in the form of a downwardly flaring tube 32 which is integral with the lower end of the cylindrical portion 31 and radially outwardly curved downward, and a downwardly tapered cylindrical portion 15 integral with the lower end of the downwardly flaring portion 33 and having a gradually decreasing diameter downward. The downwardly flaring portion 33 has a peripheral wall 34 lined with a heat-insulating material 17, so that the outer peripheral surface of the flaring portion 33 serves as a non-deposition area 18 at the part thereof to be positioned under the melt surface. The cooling member 30 is immersed in the molten metal 12 so that the melt surface is positioned at an intermediate point of the height of the cylindrical portion 31, with the lower end of the member 30 positioned slightly above the lower ends of baffles 13. As in the case of the first embodiment, a high-purity metal is caused to crystallize out in the form of a block 21 on a deposition area 19 by one of the two methods described. In this case, a flow having an upward velocity component is prevented by the cylindrical portion 31 from occurring in the molten metal 12 in the vicinity of the portion 31. A flow having a downward velocity component is produced in the molten metal 12 by the downwardly flaring portion 32 in the vicinity thereof. Consequently, the flow having a downward velocity component is produced in the melt 12 in the vicinity of the upper part of the portion, present under the melt surface, of the cooling member 30.

Figure 4:
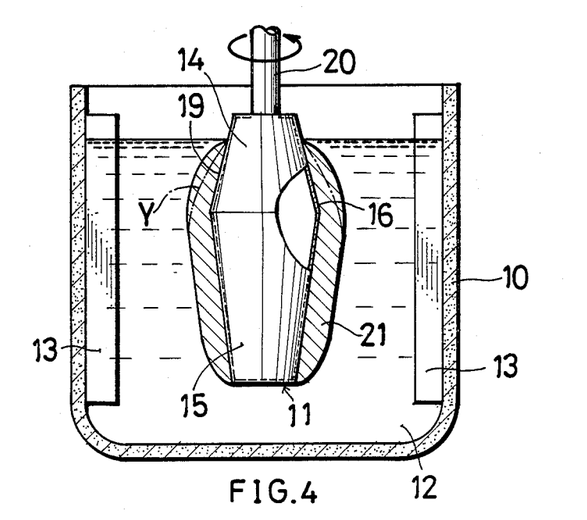
FIG. 4 is a view partly broken away and in vertical section showing another apparatus for practicing the method of the invention, i.e. a fourth embodiment.

With reference to FIG. 4 showing another apparatus as a fourth embodiment, the downwardly flaring tapered cylindrical portion 15 of the hollow rotary cooling member 11 has a peripheral wall 16 which is lined with no heat insulating material 17. Accordingly, the entire outer peripheral surface of the cooling member 11 at the portion thereof under the melt surface serves as a high-purity metal deposition area 19, and there is no non-deposition portion 18. Baffles 13 have upper ends projecting upward beyond the melt surface. With the exception of these features, the fourth embodiment has the same construction as the first. As in the case of the first embodiment, a high-purity metal is caused to crystallize out in the form of a block 21 on the deposition area 19 by one of the two methods. Before the metal block is formed in this case, a flow having a downward velocity component is produced by the downwardly flaring portion 14 in the molten metal 12 in the vicinity of the portion 14. Whichever of the two methods may be used, the high-purity metal block starting to grow around the downwardly flaring portion 14 has a downwardly flaring outer peripheral surface, which produces a flow having a downward velocity component in the molten metal 12 in the vicinity of the portion 14. The dot-and-dash lines Y in FIG. 4 represent the shape of the upper portion of the metal block 21 formed around the flaring portion 14 when the second of the two methods is resorted to.

Figure 5:
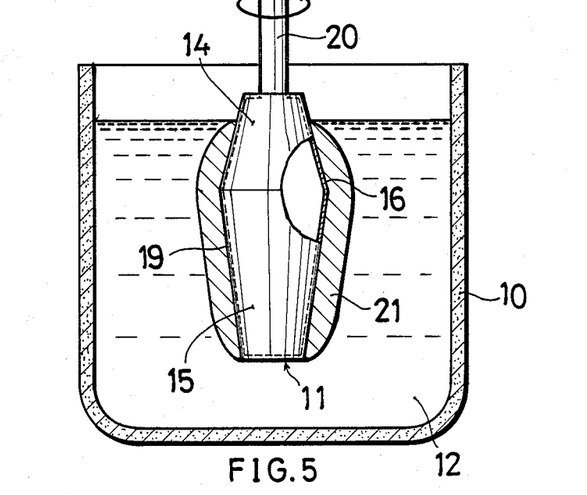
FIG. 5 is a view partly broken away and in vertical section showing another apparatus for practicing the method of the invention, i.e. a fifth embodiment.

With reference to FIG. 5 showing another apparatus as a fifth embodiment, the crucible 10 is provided with none of the baffles 13 on its inner periphery. The fifth embodiment differs from the fourth only in this respect.

As is the case with the fourth embodiment, a high-purity metal is prepared in the form of a block 21 crystallizing out on the deposition area 19 by either one of the two methods.

Figure 6:
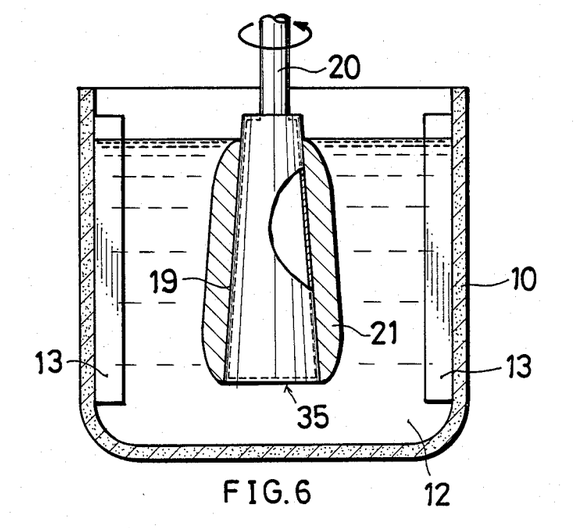
FIG. 6 is a view partly broken away and in vertical section showing another apparatus for practicing the method of the invention, i.e. a sixth embodiment.

With reference to FIG. 6 showing a sixth embodiment of the invention, this embodiment differs from the fourth in that a hollow rotary cooling member 35 is in the form of a downwardly flaring (upwardly tapered) cylinder in its entirety. As is the case with the fourth embodiment, a high-purity metal is caused to crystallize out in the form of a block 21 on the deposition area 19 by either one of the two methods. The rotary cooling member 35, when rotated, produces in the molten metal 12 a flow having a downward velocity component in the vicinity of the upper part of the cooling member portion present under the melt surface also in this case, whereby the waving of the melt surface is inhibited.

Figure 7:
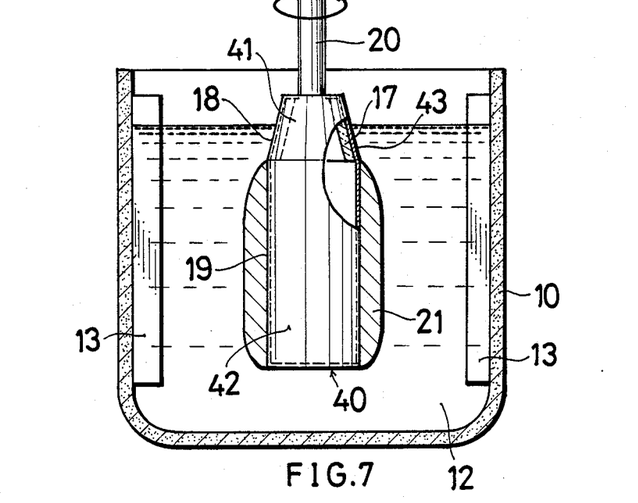
FIG. 7 is a view partly broken away and in vertical section showing another apparatus for practicing the method of the invention, i.e. a seventh embodiment.

With reference to FIG. 7 showing a seventh embodiment of apparatus, a hollow rotary cooling member 40 comprises a downwardly flaring tapered cylindrical portion 41 having a diameter gradually increasing from its upper end downward and shorter than the downwardly flaring like portion of the first embodiment, and a cylindrical portion 42 integral with the lower end of the downwardly flaring portion 41. The flaring portion 41 has a peripheral wall 43 lined with a heat insulating material 17. The outer peripheral surface of the flaring portion 41 at the portion thereof to be present under the melt surface serves as a non-deposition area 18. The peripheral wall of the cylindrical portion 42 is not covered with any heat insulating material and has an outer peripheral surface serving as a high-purity metal deposition area 19. Baffles 13 have upper ends projecting upward beyond the melt surface. With the exception of these features, the seventh embodiment has the same construction as the first embodiment. Like the first embodiment, this embodiment prepares a high-purity metal by either one of the two methods. In this case, a flow having a downward velocity component is also produced in the molten metal 12 in the vicinity of the downwardly flaring tapered portion 41.

Figure 8:
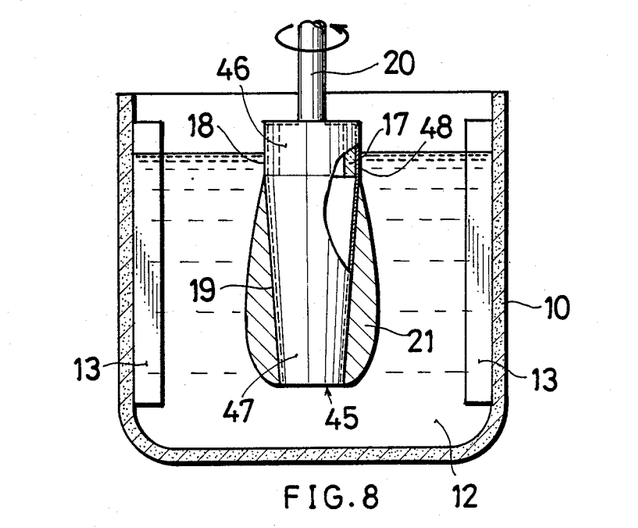
FIG. 8 is a view partly broken away and in vertical section showing another apparatus for practicing the method of the invention, i.e. an eighth embodiment.

With reference to FIG. 8 showing an eighth embodiment of apparatus, a hollow rotary cooling member 45 comprises a cylindrical portion 46 extending from its upper end over a predetermined length, and a downwardly tapered cylindrical portion 47 integral with the lower end of the cylindrical portion 46 and having a diameter gradually decreasing downward and a larger length than like portion of the first embodiment. The cylindrical portion 46 has a peripheral wall 48 lined with a heat insulating material 17, so that the outer peripheral surface of the portion 46 at the part thereof to be positioned under the melt surface serves as a non-deposition area 18. The cooling member 45 is immersed to such a position that the melt surface is located at an intermediate point of the height of the cylindrical portion 46, with the lower end of the member 45 slightly above the lower ends of baffles 13.

The second of the two methods described with reference to the first embodiment will be used when the cooling member 45 is rotated with a cooling fluid supplied to its interior. The temperature of at least the upper portion of the metal deposition area 19 is so adjusted as to be highest at its upper end and to decrease downward, whereby the velocity of crystallization of a high-purity metal on the upper portion of the deposition area 19 is made lowest at the upper end and made to increase downward, thereby permitting the high-purity metal to crystallize out on the area 19 in the form of a block 21. The block 21 deposited around the area 19 then has a downwardly flaring outer peripheral surface at its upper portion. The cylindrical portion 46 prevents occurrence of a flow of melt 12 having an upward velocity component in the vicinity thereof. After the formation of the metal block 21 is started, a flow having a downward velocity component is produced by the downwardly flaring outer periphery of the block 21 in the molten metal 21 in the vicinity thereof. Consequently, around the cylindrical portion 46 under the melt surface to the vicinity of the upper part of the downwardly flaring outer periphery of the metal block 21, a flow with a downward velocity component is produced in the molten metal 12. The temperature of the deposition area is so adjustable as to be highest at its upper end and to decrease downward by the means or methods already described with reference to the first embodiment.

Figure 9:
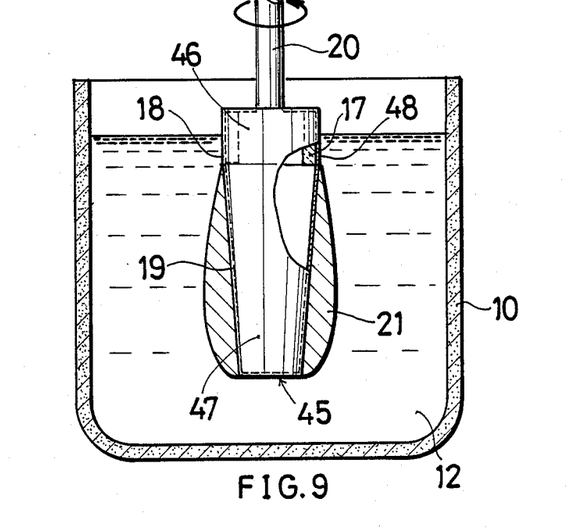
FIG. 9 is a view partly broken away and in vertical section showing another apparatus for practicing the method of the invention, i.e. a ninth embodiment.

With reference to FIG. 9 showing a ninth embodiment of apparatus, this embodiment differs from the eighth embodiment only in that the crucible 10 is not provided with any baffle on its inner periphery. A high-purity metal is prepared in the same manner as in the eighth embodiment.

Figure 10:
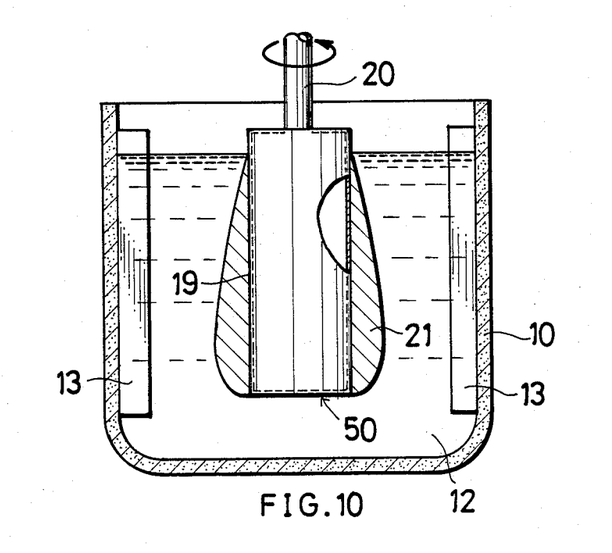
FIG. 10 is a view partly broken away and in vertical section of another apparatus for practicing the method of the invention, i.e. a tenth embodiment.

With reference to FIG. 10 showing a tenth embodiment of apparatus, a hollow rotary cooling member 50 is in the form of a cylinder having a uniform diameter over the entire length and has no heat insulating material covering its peripheral wall. Accordingly, the entire outer peripheral surface of the portion to be positioned under the melt surface of the cooling member serves as a high-purity metal deposition area 19. The member 50 has no non-deposition area. A high-purity metal is prepared in the same manner as in the eighth embodiment. In this case, the metal block 21 crystallizing out on the area 19 has a downwardly flaring outer peripheral surface, so that after the formation of the block 21 is started, a flow having a downward velocity component is produced in the molten metal 12 in the vicinity of the deposition area 19.

Figure 11:
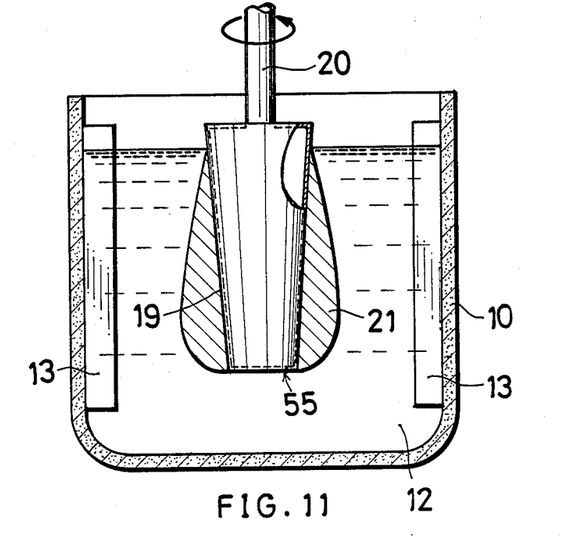
FIG. 11 is a view partly broken away and in vertical section of another apparatus for practicing the method of the invention, i.e. an eleventh embodiment.

With reference to FIG. 11 showing an eleventh embodiment of apparatus, this embodiment differs from the tenth embodiment in that the hollow rotary cooling member 55 of this embodiment is in the form of a downwardly tapered cylinder in its entirety. A high-purity metal is prepared in the same manner as in the tenth embodiment. The metal block crystallizing out on the area 19 has a downwardly flaring outer peripheral surface at least at its upper portion. After the formation of the metal block is started, therefore, a flow having a downward velocity component is produced in the molten metal 12 in the vicinity of the deposition area 19.

Figure 12:
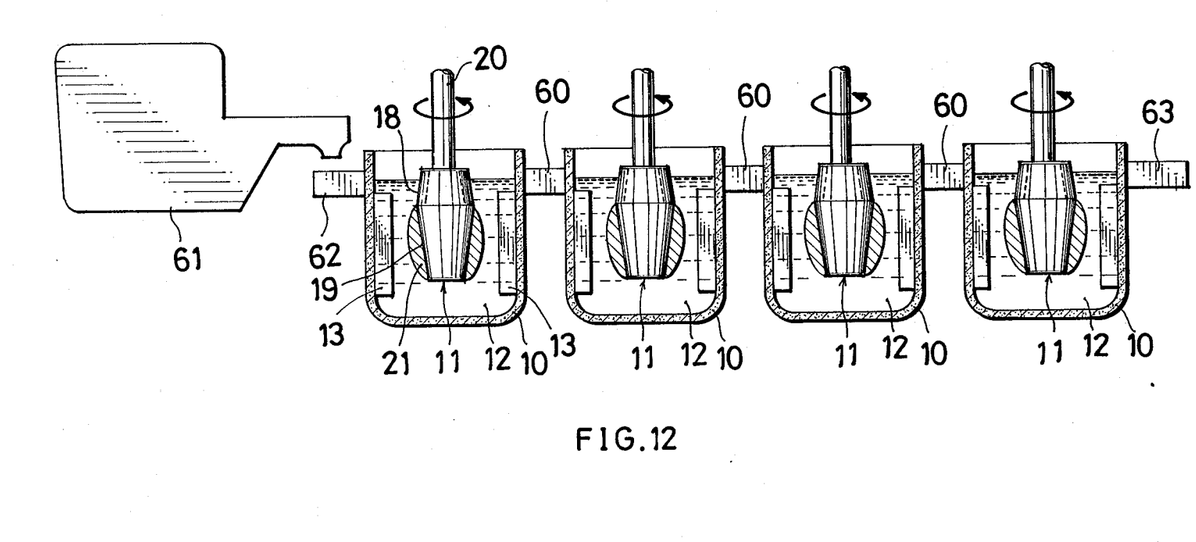
FIG. 12 is a view in vertical section of another apparatus for practicing the method of the invention, i.e. a twelfth embodiment.

FIG. 12 shows a twelfth embodiment which comprises a plurality of apparatus according to the first embodiment, as arranged side by side. The crucibles 10 are interconnected in communication with one another at their upper ends by connecting troughs 60. A melting furnace 61 is disposed at the left side of the crucible 10 at the left end. The crucible 10 at the left end has a receiving trough 62 for receiving molten metal from the melting furnace 61, while the crucible 10 at the right end is provided at its upper end with a melt discharge trough 63.

The metal to be purified and melted in the furnace 61 is supplied to the crucibles 10. When a specified amount of molten metal has been placed into each crucible 10, each cooling member 11 is lowered into the molten metal and rotated while supplying a cooling fluid to the interior of the member 11 through the fluid supply pipe within the hollow rotary shaft 20. Consequently, a high-purity metal block 21 crystallizes out on the deposition area of the cooling member 11. The molten metal in each crucible 10 is treated in the same manner as in the first embodiment.

When the metal to be purified by the present embodiment contains impurities which are peritectic with the metal, a crucible equipped with an agitator is preferably interposed between the melting furnace 61 and the crucible 10 at the left end although not shown. The molten metal is first supplied from the furnace 61 to the crucible, in which the metal is agitated by the agitator with addition of an element which forms insoluble compounds with peritectic impurities. The element then reacts with the peritectic impurities contained in the molten metal, forming insoluble compounds. The excess of the element is removed in the same manner as eutectic impurities. In the crucible 10, these compounds are moved away from the cooling member 11 by the centrifugal force due to the rotation of the cooling member 11. This eliminates the likelihood that the compounds will become incorporated in the metal block formed on the periphery of the cooling member 11. When the metal to be purified is aluminum, the peritectic impurities are Ti, V, Zr, etc., and the element to be added is, for example, boron. Examples of insoluble compounds are $TiB_2$, $VB_2$, $ZrB_2$ and the like.

Figure 13:
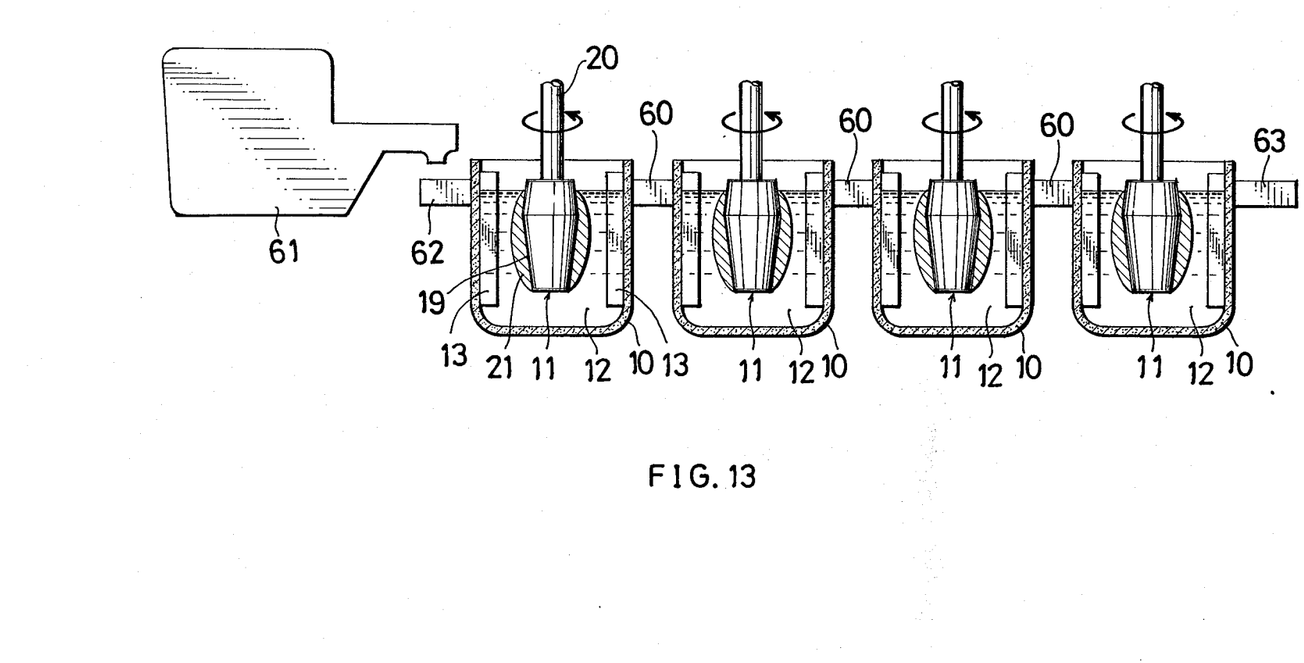
FIG. 13 is a view in vertical section of another apparatus for practicing the method of the invention, i.e. a thirteenth embodiment.

FIG. 13 shows a thirteenth embodiment, which, like the twelfth embodiment, comprises a plurality of apparatus according to the fourth embodiment as arranged in a row. Like the twelfth embodiment, the present embodiment prepares a high-purity metal. Molten metal is purified in each crucible in the same manner as in the fourth embodiment.

Figure 14:
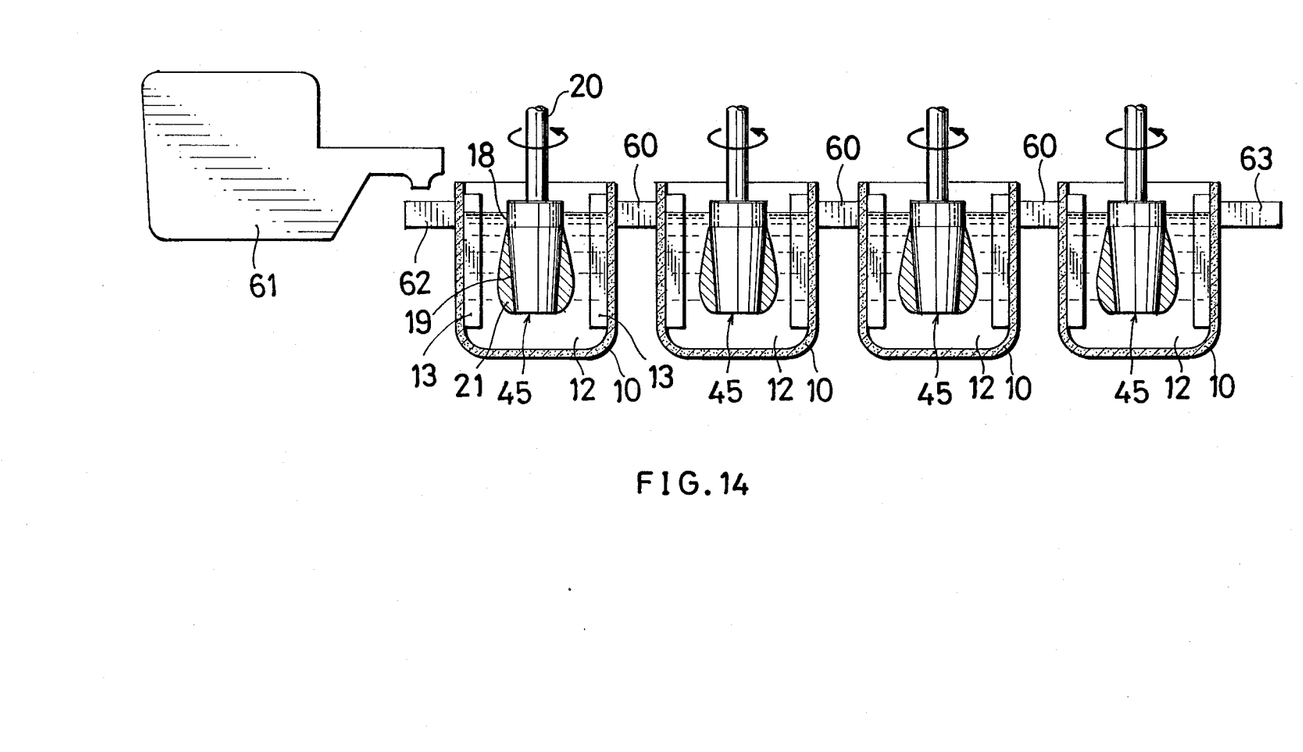
FIG. 14 is a view in vertical section of another apparatus for practicing the method of the invention, i.e. a fourteenth embodiment.

FIG. 14 shows a fourteenth embodiment, which, like the twelfth embodiment, comprises a plurality of apparatus according to the eighth embodiment as arranged in a row. Like the twelfth embodiment, this embodiment produces a high-purity metal similarly by treating molten metal in each crucible 10 in the same manner as in the eighth embodiment.

EXAMPLES 1

The same apparatus as shown in FIG. 1 was used with the exception of employing a transparent water container in place of the crucible 10. The container, which was cylindrical, was provided on its inner periphery with six baffles 13 arranged at a predetermined spacing circumferentially of the container. The cooling member 11 was 150 mm in maximum outside diameter. With water placed in the container, the cooling member 11 was rotated at 400 r.p.m. An observation of the water revealed a flow having a downward velocity component and occurring in the water in the vicinity of an upper part of the portion of the cooling member 11 present under the surface of the water.

EXAMPLE 2

The apparatus shown in FIG. 1 was used.

The crucible was provided six baffles 13 on its inner periphery. The cooling member 11 was 150 mm in maximum outside diameter. Molten aluminum 12 containing 0.07 wt. % of Fe and 0.04 wt. % of Si was placed into the crucible 10 and maintained at 670° C. by heating. Subsequently, the rotary cooling member 11 was immersed into the molten aluminum 12 and rotated at 400 r.p.m. while supplying a cooling fluid to the interior of the member. After holding the cooling member 11 in rotation for 30 minutes, the member was stopped and raised. An aluminum block 21, weighing 10 kg, crystallized out on the deposition area of the cooling member 11. The aluminum block 21 was thereafter removed from the periphery of the cooling member 11, and the mean impurity concentrations of Fe and Si in the block were measured, which were 0.0035 wt. % Fe and 0.0058 wt. % Si. These values were divided by the corresponding initial impurity concentrations to obtain effective distribution coefficients of: K (Fe)=0.05 and K (Si)=0.14. During the operation, the molten aluminum 12 retained a placid surface and was free from scum.

EXAMPLE 3

The apparatus shown in FIG. 4 was used.

The procedure of Example 2 was repeated under the same conditions except that the atmosphere above the surface of the molten aluminum 12 in the crucible 10 was maintained at 700° C. by heating. An aluminum block 21, weighing 13 kg, was crystallized out on the deposition area 19 of the cooling member 11. The block 21 had a downwardly flaring outer peripheral surface at its upper portion. The mean impurity concentrations of Fe and Si in the aluminum block 21 were found to be 0.0050 wt. % and 0.0070 wt. %, respectively. The effective distribution coefficients were K (Fe)=0.07 and K (Si)=0.17. During the operation, the molten aluminum 12 retained a placid surface and was free from scum.

EXAMPLE 4

The apparatus shown in FIG. 8 was used.

The crucible 10 was provided with six baffles 13 on its inner periphery. The cylindrical portion 46 of the cooling member 45 was 150 mm in outside diameter. Molten aluminum 12 containing 0.07 wt. % of Fe and 0.04 wt. % of Si was placed into the crucible 10 and maintained at 670° C. by heating. The atmosphere above the surface of the molten aluminum 12 was maintained at 700° C. by heating. The rotary cooling member 45 was immersed into the molten aluminum 12, rotated at 400 r.p.m. while supplying a cooling fluid to the interior of the member for 30 minutes, then stopped and raised. An aluminum block 21 weighing 10 kg crystallized out around the cooling member 45. The aluminum block 21 was thereafter removed from the periphery of the member 45. The mean impurity concentrations of Fe and Si in the aluminum block 21 measured were 0.0046 wt. % and 0.0067 wt. %, respectively. These values were divided by the corresponding initial impurity concentrations to obtain effective distribution coefficients of: K (Fe)=0.06 and K (Si)=0.16. Although the melt surface somewhat waved immediately after the start of the operation, the waves disappeared in the meantime, and the molten aluminum 12 thereafter retained a placid surface and was free from scum.

COMPARATIVE EXAMPLE 1

The procedure of Example 2 was repeated under the same conditions using the apparatus of FIG. 4 except that the hollow rotary cooling member was in its entirety in the form of a downwardly tapered cylinder having a diameter gradually decreasing from its upper end downward, the member having a high-purity metal deposition area over the entire peripheral surface of the portion thereof to be positioned under the melt surface.

The operation deposited 10 kg of an aluminum block on the periphery of the cooling member. The aluminum block had an upwardly tapering outer peripheral surface. The aluminum block was thereafter removed from the periphery of the cooling member. The mean impurity concentrations of Fe and Si in the block measured were 0.0070 wt. % and 0.0088 wt. %, respectively. The effective distribution coefficients were K (Fe)=0.1 and K (Si)=0.21. During the operation, the molten aluminum markely spattered about from its surface and produced a large amount of scum. The scum adhered to the inner periperal surface of the crucible above the melt surface, presenting difficulty in continuing the purification procedure.

COMPARATIVE EXAMPLE 2

The procedure of Comparative Example 1 was repeated under the same conditions except that a rotary cooling member in the form of a hollow cylinder having a uniform diameter over the entire length was used in place of the downwardly tapered member. The aluminum block crystallizing out on the deposition area of the cooling member had a downwardly tapered outer periphery. The aluminum block resulting from the operation had mean impurity concentrations of 0.0065 wt. % Fe and 0.0081 wt. % Si. The effective distribution coefficients were K (Fe)=0.09 and K (Si)=0.19. In the initial stage of operation, the melt surface exhibited lesser disturbance than in the case of Comparative Example 1, but as the block of purified aluminum enlarged with continued operation, the molten metal became more markely disturbed at its surface and produced a large amount of scum.

The present invention may be embodied differently without departing from the spirit and basic features of the invention. Accordingly the embodiments herein disclosed are given for illustrative purposes only and are in no way limitative. It is to be understood that the scope of the invention is defined by the appended claims rather than by the specification and that all alterations and modifications within the definition and scope of the claims are included in the claims.

What is claimed is:

1. A method of preparing a high-purity metal by immersing a hollow rotary cooling member in a molten metal containing eutectic impurities and rotating the cooling member while supplying a cooling fluid to the interior of the cooling member, whereby the high-purity metal is caused to crystallize out on a metal deposition area of the peripheral surface portion of the cooling member present under the surface of the molten metal, the metal deposition area being the peripheral surface of at least a part of the entire portion, present under the melt surface, of the member, the method including producing a flow of molten metal having a downward velocity component in the vicinity of an upper part of the entire portion present under the melt surface of the cooling member when the high-purity metal is caused to crystallize out by rotating the cooling member.

2. A method as defined in claim 1 wherein the temperature of at least the upper portion of the metal deposition area is so adjusted as to be highest at its upper end and to decrease downward, whereby the velocity of crystallization of the high-purity metal on the upper portion of the deposition area is made lowest at the upper end and made to increase downward, thereby permitting the high-purity metal to crystallize out on the deposition area to form a metal block having a downwardly flaring outer peripheral surface at least at its upper portion and consequently producing the flow of molten metal when the cooling member is rotated.

3. A method as defined in claim 1 wherein the entire peripheral surface of the cooling member portion present under the melt surface serves as the metal deposition area, and the temperature of at least the upper portion of the metal deposition area is so adjusted as to be highest at its upper end and to decrease downward, whereby the velocity of crystallization of the high-purity metal on the upper portion of the deposition area is made lowest at the upper end and made to increase downward, thereby permitting the high-purity metal to crystallize out on the deposition area to form a metal block having a downwardly flaring outer peripheral surface at least at its upper portion and consequently producing the flow of molten metal when the cooling member is rotated.

4. A method as defined in claim 3 wherein the cooling member is in the form of a hollow cylinder at least at the upper part of the portion thereof present under the melt surface.

5. A method as defined in claim 3 wherein the cooling member is downwardly flared at least at the upper part of the portion thereof present under the melt surface.

6. A method as defined in claim 5 wherein the cooling member is in the form of a downwardly flaring tapered hollow cylinder at least at the upper part of the portion thereof present under the melt surface.

7. A method as defined in claim 5 wherein at least the upper part of the portion of the cooling member present under the melt surface comprises a cylindrical portion and a downwardly flaring cylindrical portion integral with the lower end of the cylindrical portion and having a diameter gradually increasing downward.

8. A method as defined in claim 1 wherein the portion of the cooling member present under the melt surface has an upper peripheral surface serving as a non-deposition area and a lower peripheral surface serving as the metal deposition area, and the temperature of at least the upper portion of the metal deposition area is so adjusted as to be highest at its upper end and to decrease downward, whereby the velocity of crystallization of the high-purity metal on the upper portion of the deposition area is made lowest at the upper end and made to increase downward, thereby permitting the high-purity metal to crystallize out on the deposition area to form a metal block having a downwardly flaring outer peripheral surface at least at its upper portion and consequently producing the flow of molten metal when the cooling member is rotated.

9. A method as defined in claim 8 wherein the upper part of the portion of the cooling member present under the melt surface is in the form of a cylinder, and the peripheral surface of the cylinder serves as the non-deposition area.

10. A method as defined in claim 8 wherein the upper part of the portion of the cooling member present under the melt surface is downwardly flared and has a peripheral surface serving as the non-deposition area.

11. A method as defined in claim 10 wherein the upper part of the portion of the cooling member present under the melt surface is in the form of a downwardly flaring tapered cylinder, and the peripheral surface of the cylinder serves as the non-deposition area.

12. A method as defined in claim 10 wherein the upper part of the portion of the cooling member present under the melt surface comprises a cylindrical portion and a downwardly flaring cylindrical portion integral with the lower end of the cylindrical portion and having a diameter gradually increasing downward.

13. A method as defined in claim 1 wherein the upper part of the portion of the cooling member present under the melt surface is downwardly flared and is rotated to thereby produce the flow of molten metal.

14. A method as defined in claim 13 wherein the upper part of the portion of the cooling member present under the melt surface is in the form of a downwardly flaring tapered cylinder.

15. A method as defined in claim 13 wherein at least the upper part of the portion of the cooling member present under the melt surface comprises a cylindrical portion and a downwardly flaring cylindrical portion integral with the lower end of the cylindrical portion and having a diameter gradually increasing downward.

* * * * *